US011391387B2

(12) United States Patent
Ogasawara et al.

(10) Patent No.: US 11,391,387 B2
(45) Date of Patent: Jul. 19, 2022

(54) ELECTROMAGNETIC SWITCHING VALVE

(71) Applicant: MIKUNI CORPORATION, Tokyo (JP)

(72) Inventors: Toshiki Ogasawara, Iwate (JP); Masashi Ueda, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 17/030,387

(22) Filed: Sep. 24, 2020

(65) Prior Publication Data

US 2021/0131580 A1 May 6, 2021

(30) Foreign Application Priority Data

Nov. 5, 2019 (JP) .............................. JP2019-200834

(51) Int. Cl.
*F16K 11/07* (2006.01)
*F16K 31/06* (2006.01)

(52) U.S. Cl.
CPC ...... *F16K 31/0613* (2013.01); *F16K 11/0716* (2013.01)

(58) Field of Classification Search
CPC ............. F16K 31/0613; F16K 31/0674; F16K 31/0693; F16K 31/061; F16K 11/0712; F16K 11/0716
See application file for complete search history.

(56) References Cited

U.S. PATENT DOCUMENTS

| 5,396,926 | A | * | 3/1995 | Pataki | ................. F16K 31/0613 137/596.17 |
|---|---|---|---|---|---|
| 2009/0057588 | A1 | * | 3/2009 | Reilly | ................... F16K 27/048 251/129.15 |
| 2009/0256092 | A1 | * | 10/2009 | Nordstrom | .......... F16K 31/0613 251/129.15 |
| 2015/0027573 | A1 | * | 1/2015 | Ochiai | ................ F15B 13/0402 137/625.65 |
| 2017/0167617 | A1 | * | 6/2017 | Layne | ................... B23P 15/001 |
| 2019/0061718 | A1 | * | 2/2019 | Hattori | .................. B60T 13/146 |
| 2020/0278036 | A1 | * | 9/2020 | Miyagi | ................. F16K 27/041 |
| 2021/0033081 | A1 | * | 2/2021 | Hayama | .............. F04B 27/1804 |

FOREIGN PATENT DOCUMENTS

JP          2009063022      3/2009
WO   WO-2019159998 A1 * 8/2019 .............. F04B 27/18

* cited by examiner

*Primary Examiner* — Kelsey E Cary
(74) *Attorney, Agent, or Firm* — JCIPRNET

(57) ABSTRACT

An electromagnetic switching valve includes: a sleeve, defining a port communicating with an oil passage; a spool, reciprocally movably disposed on a predetermined axis in the sleeve, opening and closing the port; an electromagnetic actuator, including a plunger disposed on the axis and a stator exerting magnetomotive force on the plunger; and a tubular transmission member, disposed on the axis to be interposed between the plunger and the spool and transmit driving force. The stator includes an insertion hole through which the transmission member is inserted. The transmission member includes a regulated part regulated not to deviate from a range allowing an upper end of the transmission member to be inserted into the insertion hole of the stator when the transmission member is dropped and assembled into the sleeve from a vertical direction for a lower end of the transmission member to abut against the spool integrated into the sleeve.

11 Claims, 12 Drawing Sheets

ELECTROMAGNETIC SWITCHING VALVE

CROSS-REFERENCE TO RELATED APPLICATION

This application claims the priority benefit of Japan Application No. 2019-200834, filed on Nov. 5, 2019. The entirety of the above-mentioned patent application is hereby incorporated by reference herein and made a part of this specification.

BACKGROUND

Technical Field

The disclosure relates to an electromagnetic switching valve that operates a spool by an electromagnetic actuator and switches an oil passage of hydraulic oil. In particular, the disclosure relates to an electromagnetic switching valve applied to a valve timing changing device, wherein the valve timing changing device changes opening and closing timing (valve timing) of an intake valve or an exhaust valve in an internal combustion engine mounted on a vehicle such as an automobile or a two-wheeler or the like.

Related Art

As a conventional electromagnetic switching valve, there has been known an electromagnetic spool valve including: a spool valve, including a sleeve, a spool slidably disposed in the sleeve, and a return spring returning the spool to a rest position; an electromagnetic actuator, including a coil, a plunger and a stator; and a shaft of a tubular shape as a transmission member, interposed between the plunger and the spool and transmitting a driving force (for example, see Patent Document 1).

When this electromagnetic spool valve is assembled, the following procedure is conceivable: the spool valve in which the return spring and the spool are pre-assembled in the sleeve, the shaft, and the electromagnetic actuator in which the plunger and the stator and the like are pre-assembled are prepared, and the shaft is then connected and assembled so as to be sandwiched between the spool valve and the electromagnetic actuator.

Here, as one assembly method, the sleeve is fixed with an opening facing vertically upward so that the spool and the like do not fall out, then the shaft is dropped from above so as to abut against the spool, and the electromagnetic actuator is brought close from above the shaft to be connected. In this case, when the shaft is tilted with respect to the vertical direction, the plunger of the electromagnetic actuator will not be properly connected to the shaft.

To deal with this, it is necessary to assemble the electromagnetic actuator while holding the shaft upright by using a jig or the like, and the assembly work is troublesome.

As another assembly method, the electromagnetic actuator is fixed with an opening facing vertically upward, then the shaft is dropped from above so as to abut against the plunger, and the spool valve is brought close from above the shaft to be connected. In this case, it is necessary to hold the spool and the like in the sleeve by using a jig or the like so that the spool and the like do not fall out, and the assembly work is troublesome in the same way as above.

PATENT DOCUMENTS

[Patent Document 1] Japanese Patent Laid-open No. 2009-63022

The disclosure has been made in view of the above circumstances, and an object thereof is to provide an electromagnetic switching valve aimed at simplifying and facilitating assembly work in assembling the electromagnetic switching valve, in which a transmission member transmitting a driving force of a plunger to a spool can be easily assembled.

SUMMARY

An electromagnetic switching valve of the disclosure includes: a sleeve, defining a port communicating with an oil passage supplying or discharging hydraulic oil; a spool, reciprocally movably disposed on a predetermined axis in the sleeve, opening and closing the port; an electromagnetic actuator, including a plunger disposed on the axis and a stator exerting a magnetomotive force on the plunger; and a transmission member of a tubular shape, disposed on the axis to be interposed between the plunger and the spool and transmit a driving force. The stator includes an insertion hole through which the transmission member is inserted. The transmission member includes a regulated part that is regulated not to deviate from a range allowing an upper end of the transmission member to be inserted into the insertion hole of the stator when the transmission member is dropped and assembled into the sleeve from a vertical direction to cause a lower end of the transmission member to abut against the spool integrated into the sleeve.

DESCRIPTION OF THE EMBODIMENTS

Figure 1:
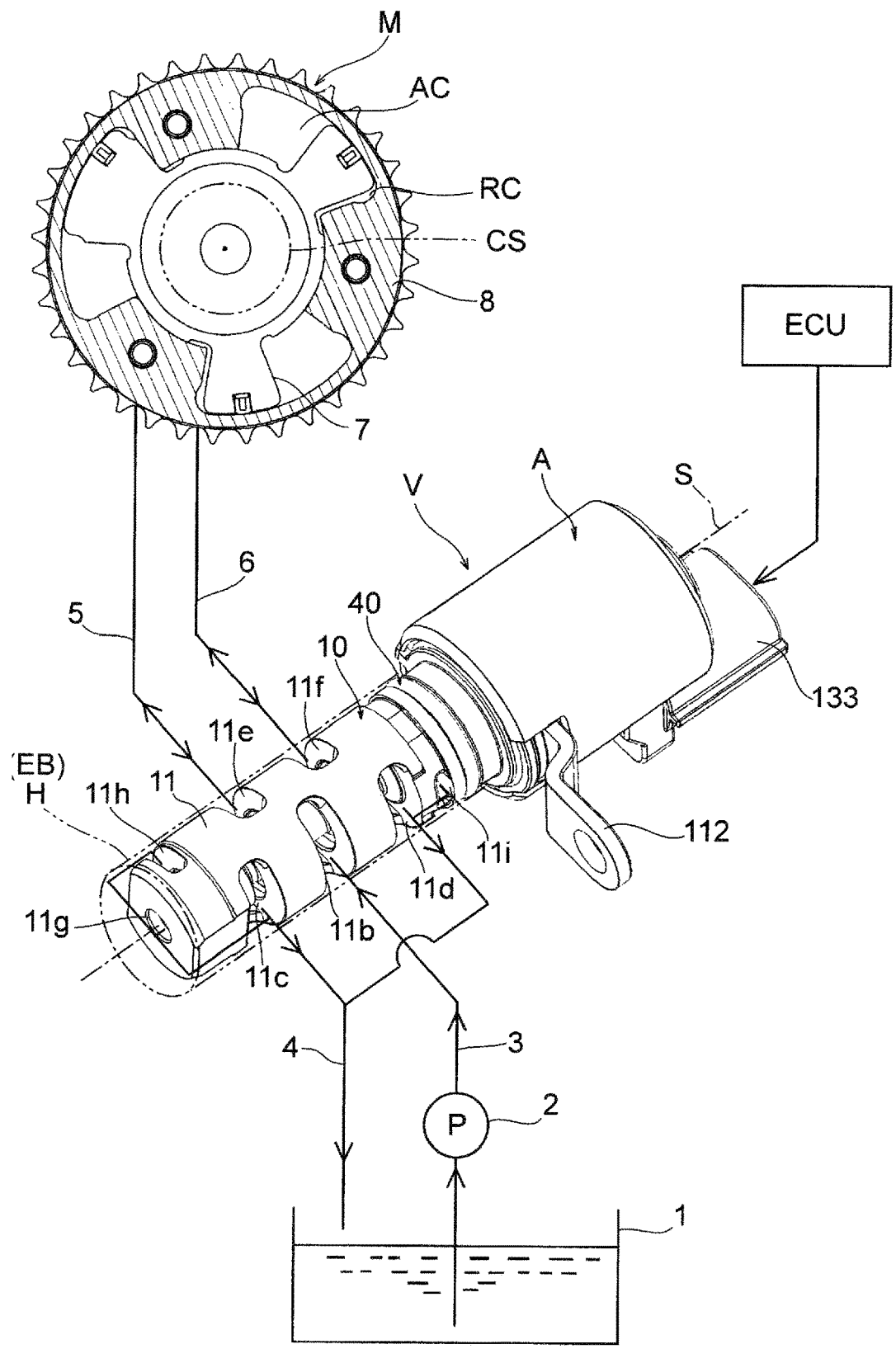
FIG. 1 is a configuration diagram of a case where an electromagnetic switching valve of the disclosure is applied to a valve timing changing device of an internal combustion engine.

Hereinafter, embodiments of the disclosure are described with reference to the accompanying drawings.

An electromagnetic switching valve V according to an embodiment of the disclosure is applied to a valve timing changing device M of an internal combustion engine.

The electromagnetic switching valve V is appropriately driven and controlled by a control unit ECU according to an operation state of a vehicle and the internal combustion engine.

An engine body EB includes: a fitting hole H into which the electromagnetic switching valve V is fitted; a supply oil passage 3 through which hydraulic oil in an oil pan 1 is supplied via an oil pump 2; a discharge oil passage 4 through which the hydraulic oil is discharged from the electromagnetic switching valve V toward the oil pan 1; a first oil passage 5 communicating with one of a retard chamber RC and an advance chamber AC of the valve timing changing device M; and a second oil passage 6 communicating with the other of the retard chamber RC and the advance chamber AC of the valve timing changing device M.

The valve timing changing device M includes: a vane rotor 7 rotating integrally with a camshaft CS; and a housing rotor 8, housing the vane rotor 7 so that the vane rotor 7 is relatively rotatable in a predetermined angle range, and rotating in conjunction with a crankshaft.

The advance chamber AC and the retard chamber RC to and from which the hydraulic oil is supplied and discharged are defined by an internal space of the housing rotor 8 and the vane rotor 7.

Here, when the valve timing changing device M is applied to the camshaft CS on an intake side, the first oil passage 5 is connected to the advance chamber AC and the second oil passage 6 is connected to the retard chamber RC.

On the other hand, when the valve timing changing device M is applied to the camshaft CS on an exhaust side, the first oil passage 5 is connected to the retard chamber RC and the second oil passage 6 is connected to the advance chamber AC.

Figure 2:
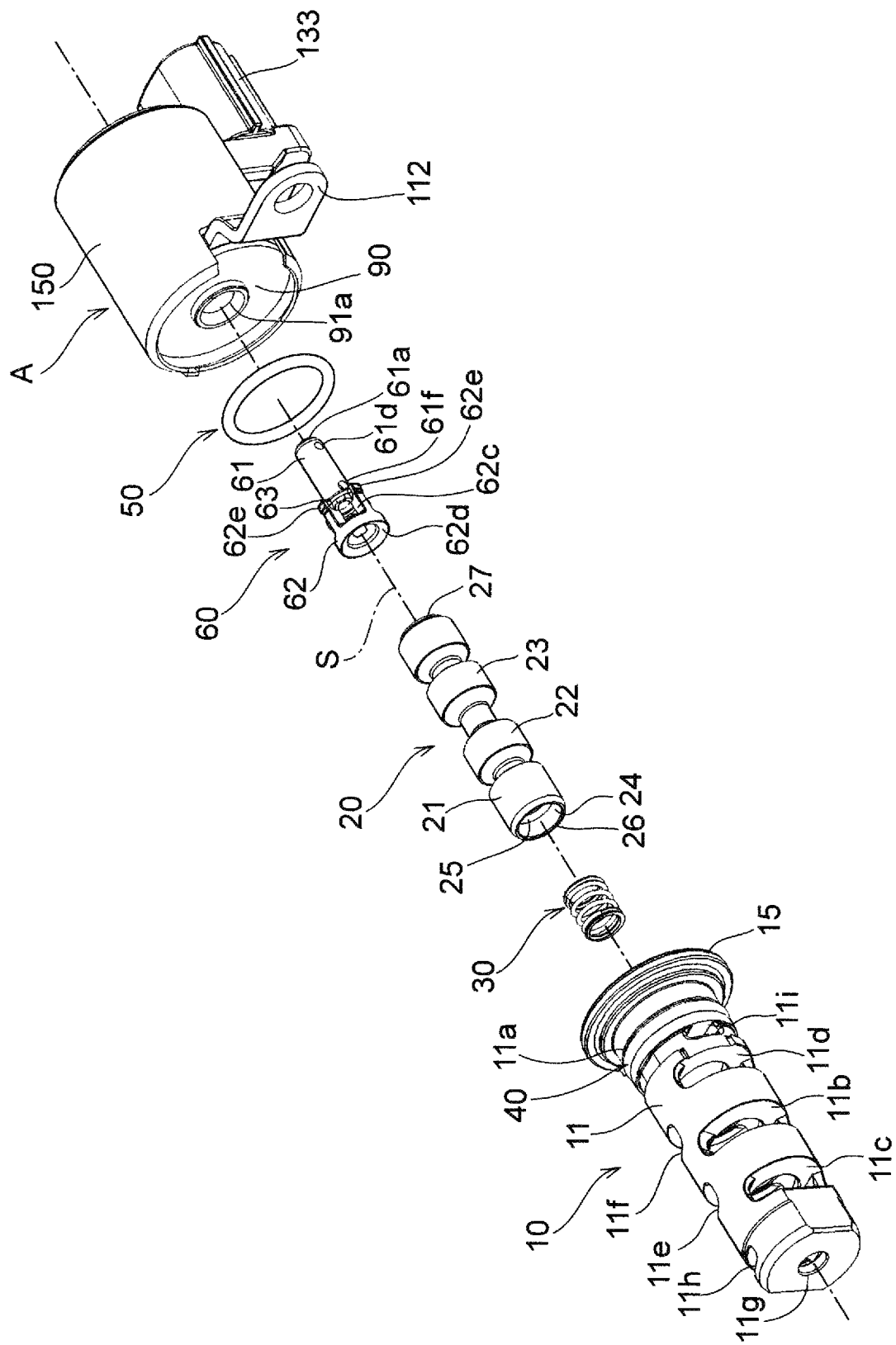
FIG. 2 is an exploded perspective view of an electromagnetic switching valve according to an embodiment of the disclosure as viewed from a sleeve side.
Figure 3:
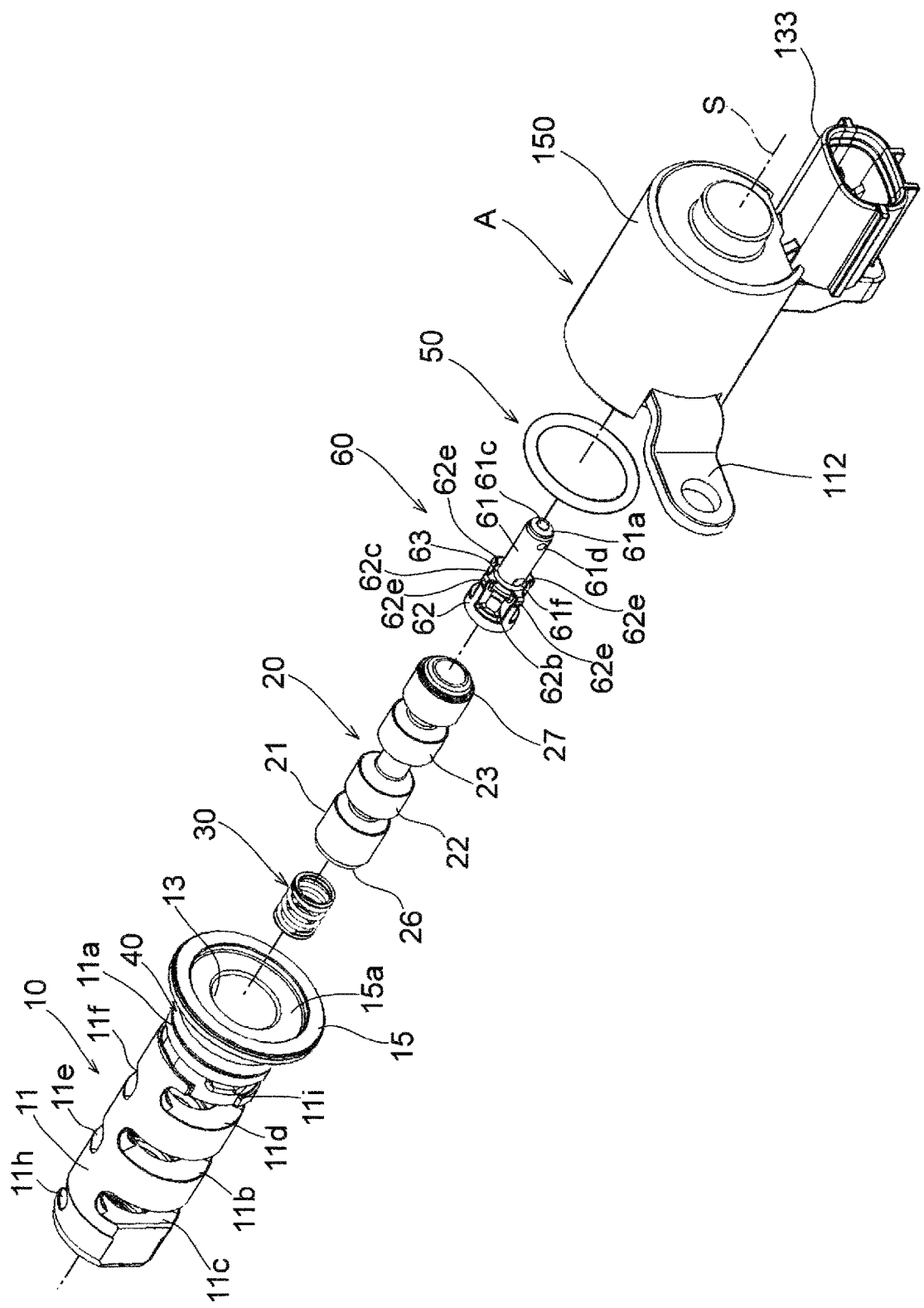
FIG. 3 is an exploded perspective view of an electromagnetic switching valve according to an embodiment of the disclosure as viewed from an electromagnetic actuator side.

As shown in FIG. 2 and FIG. 3, the electromagnetic switching valve V includes a sleeve 10, a spool 20, an energizing spring 30, seal members 40 and 50, a transmission member 60, and an electromagnetic actuator A.

Figure 4:
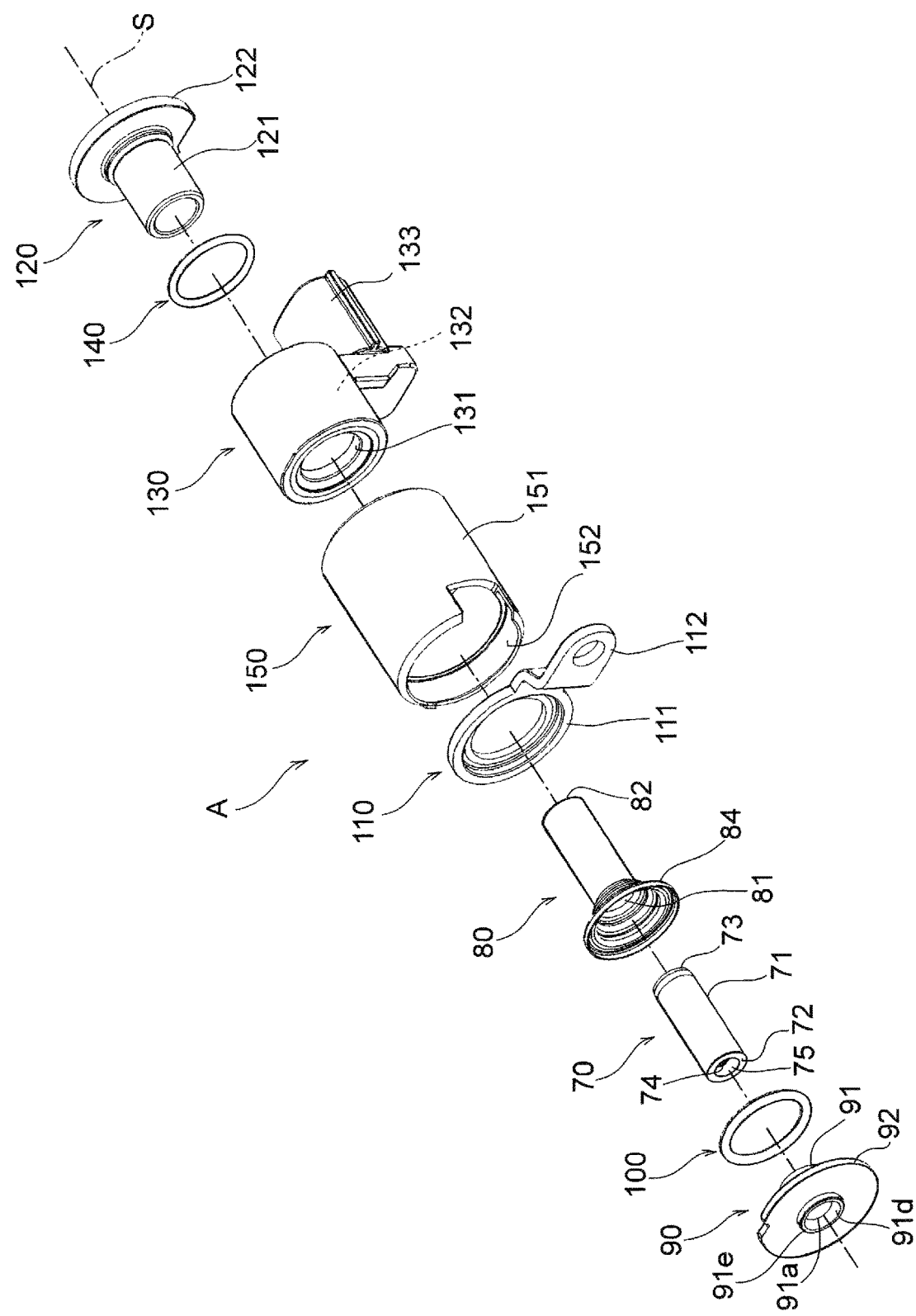
FIG. 4 is an exploded perspective view of an electromagnetic actuator included in an electromagnetic switching valve according to an embodiment.
Figure 11:
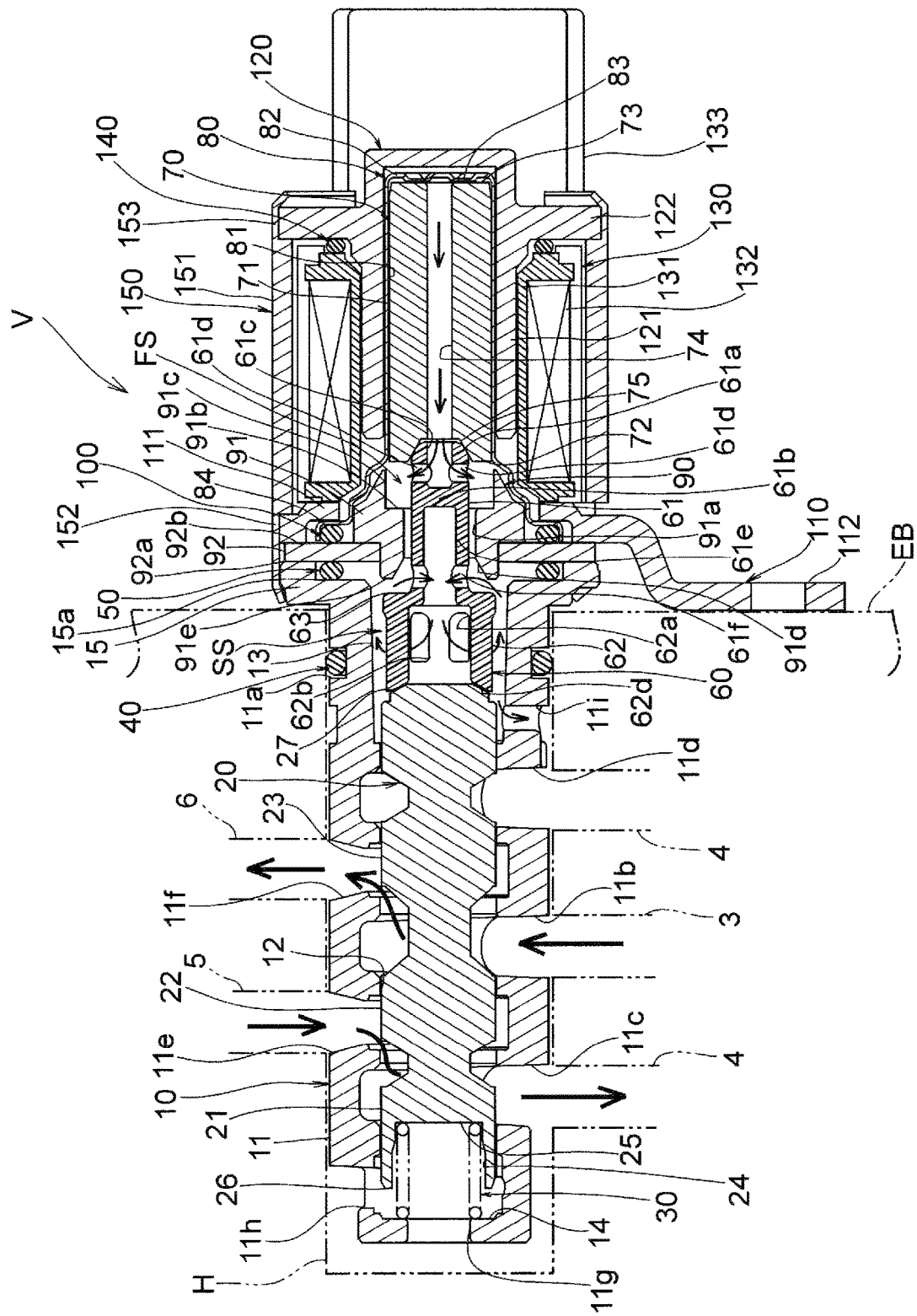
FIG. 11 is a cross-sectional view describing an operation of an electromagnetic switching valve according to an embodiment, showing a state in which a spool and a plunger are located in a rest position.
Figure 12:
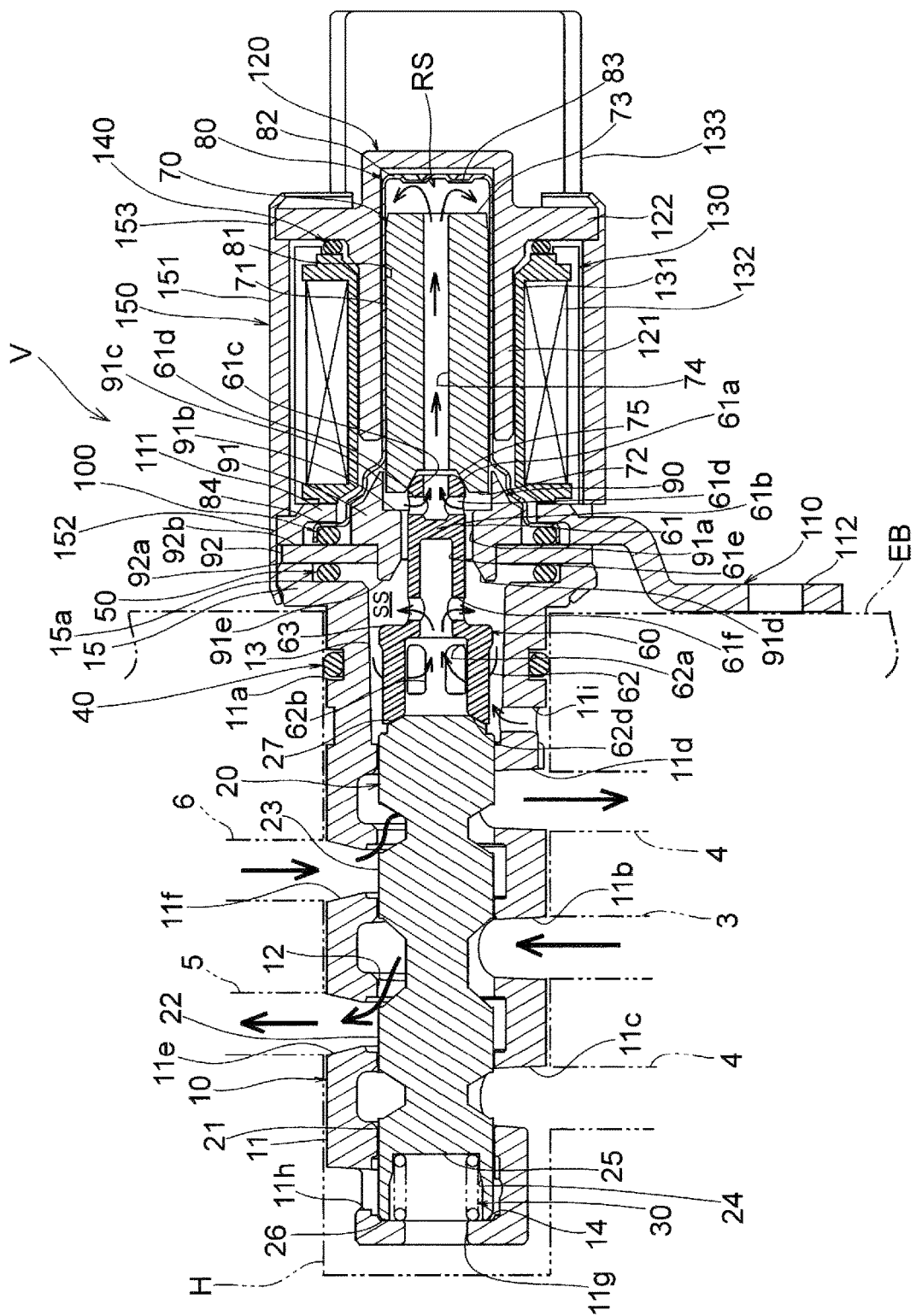
FIG. 12 is a cross-sectional view describing an operation of an electromagnetic switching valve according to an embodiment, showing a state in which a spool and a plunger advance and are located in a maximum movement position.

As shown in FIG. 4, FIG. 11 and FIG. 12, the electromagnetic actuator A includes a plunger 70, a guide sleeve 80, a stator 90, a seal member 100, a bracket 110, an inner yoke 120, a mold unit 130, a seal member 140, and an outer yoke 150.

The sleeve 10 is formed of a metal material such as aluminum or the like into a cylindrical shape centered on an axis S, and includes, as shown in FIG. 2, FIG. 3 and FIG. 11, an outer peripheral surface 11, a seal groove 11a, a supply port 11b, discharge ports 11c and 11d, a first port 11e, a second port 11f, communication passages 11g, 11h and 11i, an inner peripheral surface 12, an inner peripheral surface 13, a receiving part 14, and a flange 15.

The outer peripheral surface 11 is formed as a cylindrical surface centered on the axis S, and is fitted in the fitting hole H of the engine body EB.

The seal groove 11a is formed as an annular groove on the outer peripheral surface 11 for the seal member 40 to be fitted therein.

The supply port 11b communicates with the supply oil passage 3. The discharge ports 11c and 11d communicate with the discharge oil passage 4. The first port 11e communicates with the first oil passage 5. The second port 11f communicates with the second oil passage 6.

The communication passage 11g is formed at an end of the sleeve 10 and communicates a space where the energizing spring 30 is disposed with the discharge oil passage 4.

The communication passage 11h opens in a radial direction near the end of the sleeve 10 and communicates the space where the energizing spring 30 is disposed with the discharge oil passage 4.

The communication passage 11i communicates an internal space SS where the transmission member 60 is disposed with the discharge oil passage 4 in a region of the inner peripheral surface 13 of the sleeve 10.

The inner peripheral surface 12 is formed as a cylindrical surface centered on the axis S, and makes close contact with and slidably guides the outer peripheral surface 21 of the spool 20.

The inner peripheral surface 13 is formed as a conical surface centered on the axis S, having a larger inner diameter than the inner peripheral surface 12 and widened at an end toward the flange 15, and is formed so that the internal space SS is secured around the transmission member 60 in the state in which the transmission member 60 is disposed.

The receiving part 14 serves to receive a first end 26 of the spool 20 and stop the spool 20 in a maximum advance position, and also serves to receive one end of the energizing spring 30.

The flange 15 is joined to the stator 90 with an end of the outer yoke 150 being crimped, and is connected and fixed to the electromagnetic actuator A. In addition, in the flange 15, an annular recess 15a is provided housing the seal member 50 so as to sandwich the seal member 50 in cooperation with the stator 90.

As shown in FIG. 2, FIG. 3 and FIG. 11, the spool 20 is formed so as to extend in the axis S direction, and includes the outer peripheral surface 21, a first valve 22, a second valve 23, a recess 24, a receiving part 25, the first end 26, and a second end 27.

To slide on the inner peripheral surface 12 of the sleeve 10, the outer peripheral surface 21 is formed in a cylindrical shape centered on the axis S, and has an outer diameter substantially the same as or slightly smaller than the inner diameter of the inner peripheral surface 12.

The first valve 22 is formed so as to define the outer peripheral surface 21 that is wider than an opening width of the first port 11e in the axis S direction, and opens and closes the first port 11e of the sleeve 10 by moving in the axis S direction.

The second valve 23 is formed so as to define the outer peripheral surface 21 that is wider than an opening width of the second port 11f in the axis S direction, and opens and closes the second port 11f of the sleeve 10 by moving in the axis S direction.

The recess 24 is formed on the first end 26 side so as to house the energizing spring 30 in an extensible and compressible manner.

The receiving part 25 is formed as a bottom wall of the recess 24 to receive the other end of the energizing spring 30 housed in the recess 24.

The first end 26 is formed as an annular end surface and releasably abuts against the receiving part 14 of the sleeve 10.

The second end 27 is formed as an annular and convex curved surface centered on the axis S to abut against an annular abutting part 62d as a lower end of the transmission member 60 in the axis S direction.

The energizing spring 30 is a compression type coil spring, and is assembled so that one end thereof abuts against the receiving part 14 of the sleeve 10 and the other end abuts against the receiving part 25 of the spool 20.

When the energizing spring 30 is in a rest state, as shown in FIG. 11, the energizing spring 30 exerts an energizing force causing the plunger 70 to retreat to a rest position and stopping the spool 20 in a position where the first valve 22 cuts off communication between the first port 11e and the supply port 11b and communicates the first port 11e with the discharge port 11c, and where the second valve 23 communicates the second port 11f with the supply port 11b and cuts off communication between the second port 11f and the discharge port 11d.

The seal member 40 is an O-ring made of rubber, fitted into the seal groove 11a of the sleeve 10 and sealing a space between the engine body EB and the sleeve 10.

The seal member 50 is an O-ring made of rubber, disposed in the annular recess 15a of the flange 15 of the sleeve 10 and sealing a space between the sleeve 10 and the stator 90.

Figure 5:
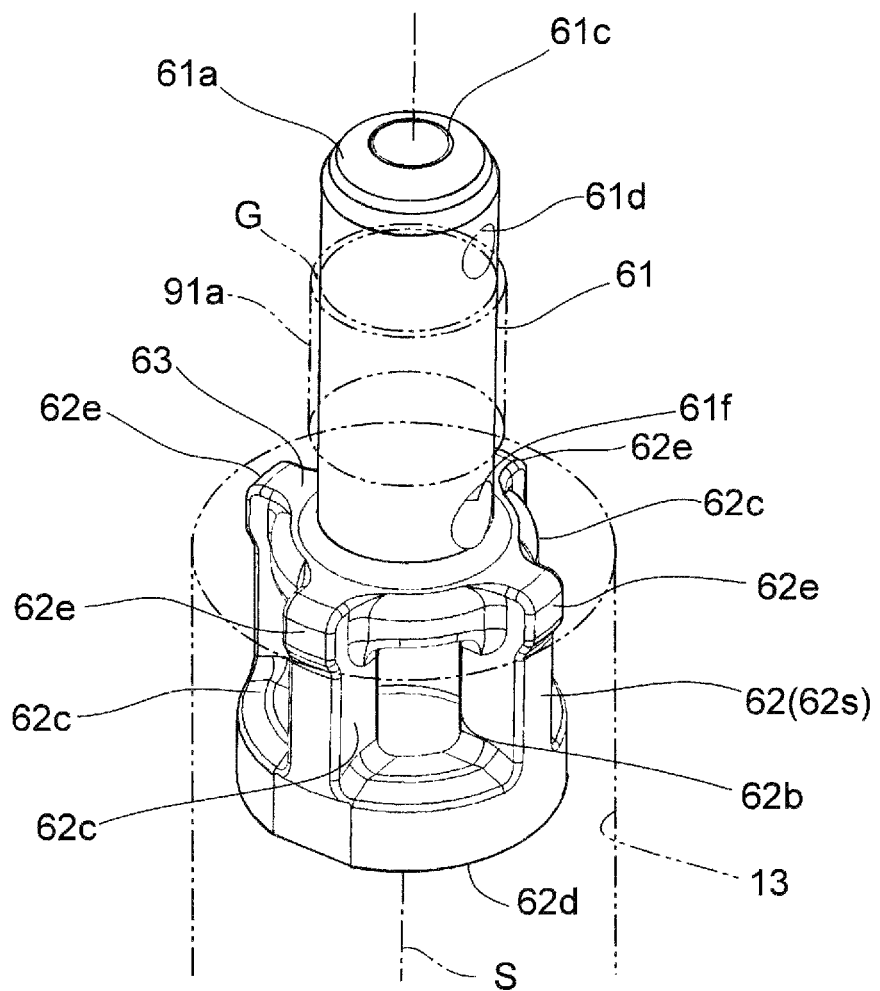
FIG. 5 is an external perspective view showing a relationship between a transmission member and an inner wall surface of a sleeve included in an electromagnetic switching valve according to an embodiment.
Figure 6:
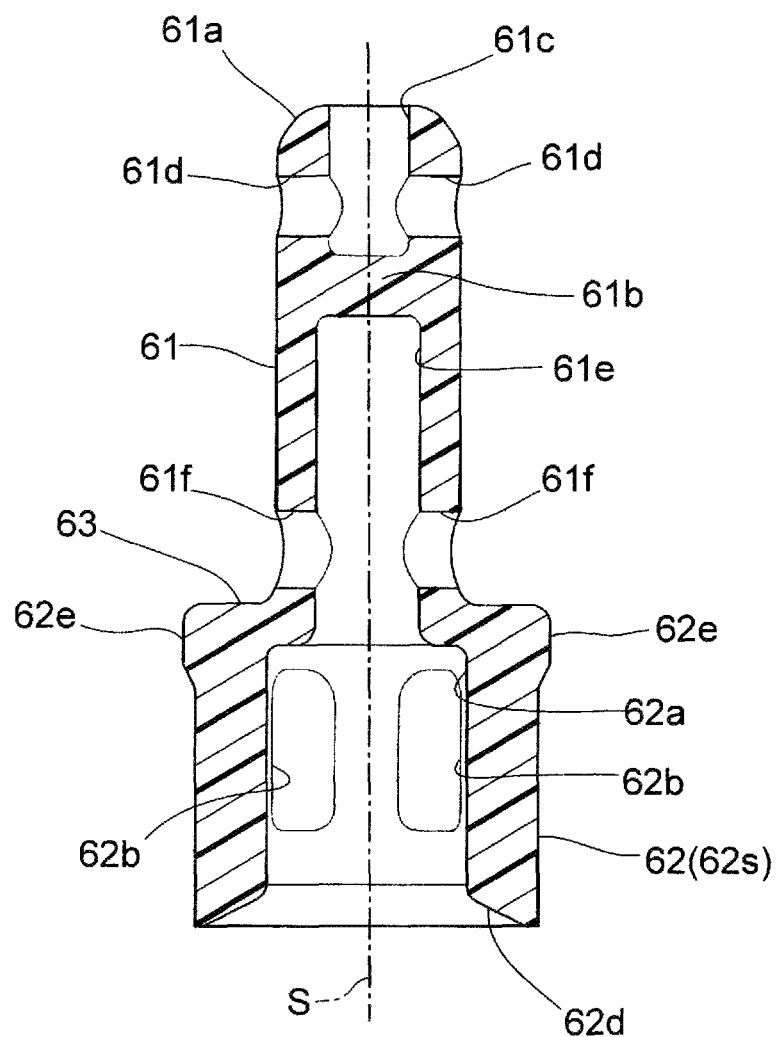
FIG. 6 is a cross-sectional view of a transmission member included in an electromagnetic switching valve according to an embodiment.
Figure 7:
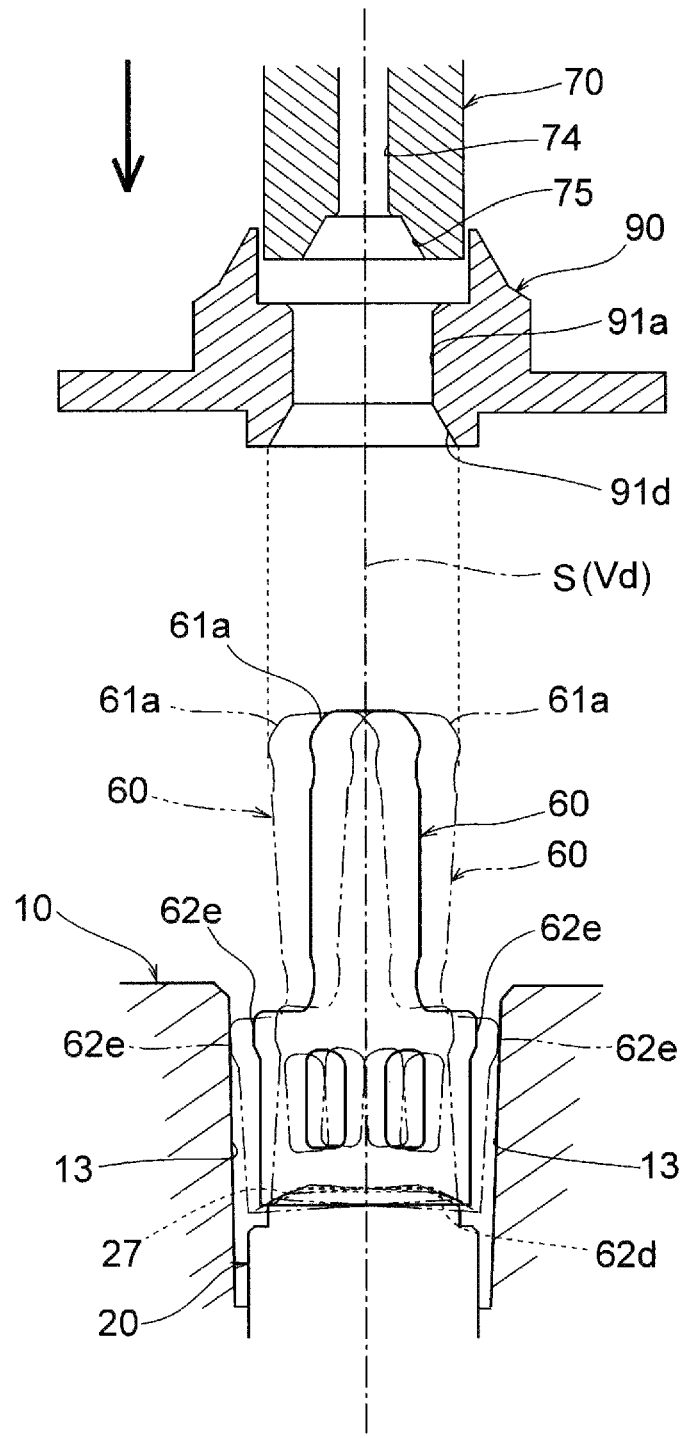
FIG. 7 is a schematic view showing a relationship between a transmission member, an inner wall surface of a sleeve, an insertion hole of a stator, and a receiving recess of a plunger that are included in an electromagnetic switching valve according to an embodiment.

The transmission member 60 is formed of a resin material into a tubular shape extending in the axis S direction to be interposed between the plunger 70 and the spool 20 and transmit the driving force. As shown in FIG. 5 to FIG. 7, the transmission member 60 includes a small-diameter tubular part 61 inserted through an insertion hole 91a of the stator 90, a large-diameter tubular part 62 disposed in the region of the inner peripheral surface 13 inside the sleeve 10, and an annular stepped part 63.

The small-diameter tubular part 61 includes an end 61a as an upper end, a facing wall 61b, a first internal passage 61c, two first openings 61d, a second internal passage 61e, and two second openings 61f.

The end 61a is formed as an annular and convex curved surface centered on the axis S, and abuts against a receiving recess 75 of the plunger 70.

The facing wall 61b is formed as a cutoff wall facing a through passage 74 of the plunger 70 in the axis S direction.

The first internal passage 61c is formed closer to the plunger 70 than the facing wall 61b in the axis S direction and forms a cylindrical hole extending in the axis S direction to communicate with the through passage 74 of the plunger 70. The passage area of the first internal passage 61c is formed equal to or larger than the passage area of the through passage 74. Here, the passage area of the first internal passage 61c is the passage area of the first internal passage 61c in a cross section perpendicular to the axis S; the passage area of the through passage 74 is the passage area of the through passage 74 in a cross section perpendicular to the axis S.

As shown in FIG. 11 and FIG. 12, the first opening 61d is formed closer to the plunger 70 than the insertion hole 91a of the stator 90 in the axis S direction and forms a circular hole that opens the first internal passage 61c in the radial direction. The passage area of the first opening 61d is formed equal to or larger than the passage area of the first internal passage 61c. Here, the passage area of the first opening 61d is the passage area of the two first openings 61d that form circular holes.

The second internal passage 61e is formed closer to the spool 20 than the facing wall 61b in the axis S direction and forms a cylindrical hole extending in the axis S direction. An inner diameter (passage area) of the second internal passage 61e is formed larger than an inner diameter (passage area) of the first internal passage 61c.

As shown in FIG. 11 and FIG. 12, the second opening 61f is formed closer to the spool 20 than the insertion hole 91a of the stator 90 in the axis S direction and forms a circular hole that opens the second internal passage 61e in the radial direction. The passage area of the second opening 61f is formed equal to or larger than the passage area of the second internal passage 61e. Here, the passage area of the second opening 61f is the passage area of the two second openings 61f that form circular holes; the passage area of the second internal passage 61e is the passage area of the second internal passage 61e in a cross section perpendicular to the axis S.

The large-diameter tubular part 62 includes an outer peripheral surface 62s, a second internal passage 62a, four second openings 62b, four lightening parts 62c formed around the second openings 62b, the annular abutting part 62d as the lower end, and four protruding ribs 62e as a regulated part and a protrusion.

To communicate with the second internal passage 61e, the second internal passage 62a is formed closer to the spool 20 than the facing wall 61b in the axis S direction and forms a cylindrical hole extending in the axis S direction. An inner diameter (passage area) of the second internal passage 62a is formed larger than the inner diameter (passage area) of the second internal passage 61e.

As shown in FIG. 11 and FIG. 12, the second opening 62b is formed closer to the spool 20 than the insertion hole 91a of the stator 90 in the axis S direction and forms a substantially rectangular hole that opens the second internal passage 62a in the radial direction. The passage area of the second opening 62b is formed equal to or larger than the passage area of the second internal passage 62a. Here, the passage area of the second opening 62b is the passage area of the four second openings 62b that form substantially rectangular holes; the passage area of the second internal passage 62a is the passage area of the second internal passage 62a in a cross section perpendicular to the axis S.

The four lightening parts 62c are formed so that a region around each of the second openings 62b is recessed radially inward from the outer peripheral surface 62s of the large-diameter tubular part 62. According to this, as shown in FIG. 5, when the transmission member 60 is disposed in the sleeve 10, a sufficient gap space that allows the flow of the hydraulic oil can be secured between the transmission member 60 and the inner peripheral surface 13.

The annular abutting part 62d is formed as an annular and concave tapered surface centered on the axis S, to define an end that opens the second internal passage 62a toward the spool 20 and to abut against the second end 27 of the spool 20.

As shown in FIG. 5 and FIG. 6, the four protruding ribs 62e are formed protruding radially outward from the outer peripheral surface 62s of the large-diameter tubular part 62 and disposed discretely in the circumferential direction (herein meaning at equal intervals in the circumferential direction).

As shown in FIG. 7, when the transmission member 60 is dropped and assembled into the sleeve 10 from a vertical direction Vd to cause the annular abutting part 62d being the lower end of the transmission member 60 to abut against the spool 20 incorporated into the sleeve 10, the four protruding ribs 62e function as the regulated part that is regulated not to deviate from a range allowing the end 61a being the upper end of the transmission member 60 to be inserted into the insertion hole 91a of the stator 90.

The annular stepped part 63 is formed at a boundary between the small-diameter tubular part 61 and the large-diameter tubular part 62, and faces an annular facing part 91e of the stator 90 in the axis S direction.

The plunger 70 is formed of a ferromagnetic material such as iron or the like into a columnar shape extending in the axis S direction, and includes, as shown in FIG. 4 and FIG. 11, an outer peripheral surface 71, a first end 72, a second end 73, a through passage 74, and a receiving recess 75.

The outer peripheral surface 71 is slidably guided in the axis S direction by an inner wall surface 81 of the guide sleeve 80.

The first end 72 forms an annular flat surface perpendicular to the axis S.

The second end 73 forms an annular flat surface perpendicular to the axis S, and abuts against a stopper 83 of the guide sleeve 80 in the rest position.

The through passage 74 forms a cylindrical hole that is disposed on the axis S, extends in the axis S direction and penetrates from the first end 72 to the second end 73.

Around the through passage 74 of the first end 72, the receiving recess 75 is formed as an annular and concave tapered surface centered on the axis S, to receive and abut against the end 61a of the transmission member 60.

The guide sleeve 80 is formed by deep drawing a sheet metal material into a bottomed cylindrical shape centered on the axis S, and includes, as shown in FIG. 4 and FIG. 11, the inner wall surface 81, a bottom wall surface 82, the stopper 83 protruding from the bottom wall surface 82, and a flange 84.

The inner wall surface 81 slidably guides the plunger 70 in the axis S direction.

The stopper 83 is formed protruding inward from the bottom wall surface 82 in the axis S direction, and serves to define the rest position of the plunger 70.

In this way, since the stopper 83 is formed protruding inward, in a state in which the plunger 70 is abutting against the stopper 83, a gap space is defined between the second end 73 of the plunger 70 and the bottom wall surface 82. Accordingly, it can be prevented that the plunger 70 adheres to the bottom wall surface 82 of the guide sleeve 80 and becomes inoperable.

The flange 84 includes a region formed in a multistep conical shape so as to cover the transmission member 60 from the outside in the radial direction, and is sandwiched and fixed between the stator 90 and the bracket 110 together with the seal member 100.

In a relationship between the guide sleeve 80 and the plunger 70 described above, when the plunger 70 is located in an advance position in a direction of compressing the energizing spring 30, as shown in FIG. 12, by the inner wall surface 81 and the bottom wall surface 82 of the guide sleeve 80 and the second end 73 of the plunger 70, a retreat movement space RS is defined allowing the plunger 70 to retreat to the rest position.

To form a part of a magnetic path and exert a magnetomotive force on the plunger 70 by energizing the coil 132, the stator 90 is formed of a ferromagnetic material, and a front yoke 91 having a multistep columnar shape and an end yoke 92 having a substantially disc shape are integrally fixed thereto by crimping.

As shown in FIG. 4 and FIG. 11, the stator 90 includes the insertion hole 91a, an annular facing surface 91b, an annular inner wall surface 91c, a guide part 91d, an annular facing part 91e, and joint surfaces 92a and 92b.

The insertion hole 91a forms a cylindrical hole centered on the axis S for the small-diameter tubular part 61 of the transmission member 60 to be inserted therethrough with a predetermined gap G therebetween.

Here, the passage area of the gap G defined around the transmission member 60 in the insertion hole 91a is formed equal to or smaller than the passage area of the first opening 61d. The passage area of the gap G is the passage area of the gap G having an annular shape in a cross section perpendicular to the axis S.

Moreover, the gap G is preferably as small as possible in a range in which viscous resistance of the hydraulic oil does not increase.

The annular facing surface 91b forms an annular flat surface to face the first end 72 of the plunger 70 in the axis S direction.

In addition, the insertion hole 91a is formed having an inner diameter dimension regulating the transmission member 60 not to deviate from the range allowing the end 61a of the transmission member 60 to be inserted into the receiving recess 75 of the plunger 70.

To face the outer peripheral surface 71 of the plunger 70 with a predetermined gap therebetween in the radial direction in a state in which the plunger 70 has advanced, the annular inner wall surface 91c forms a substantially cylindrical surface centered on the axis S.

The guide part 91d is formed as an annular and concave tapered surface centered on the axis S, and serves to guide the end 61a of the transmission member 60 onto the axis S when the transmission member 60 is inserted into the insertion hole 91a of the stator 90. Moreover, the guide part 91d may also be formed as an annular and concave curved surface centered on the axis S.

The annular facing part 91e has an annular shape centered on the axis S to face the annular stepped part 63 of the transmission member 60 in the axis S direction.

In an assembled state, the joint surfaces 92a and 92b form flat surfaces to make close contact with the seal members 50 and 100 and to be sandwiched and fixed by the flange 15 of the sleeve 10 and the bracket 110.

In a relationship between the stator 90 and the plunger 70 described above, when the plunger 70 is in the rest position, as shown in FIG. 11, by the annular facing surface 91b and the annular inner wall surface 91c of the stator 90 and the first end 72 of the plunger 70, an advance movement space FS is defined allowing the plunger 70 to advance in the direction of compressing the energizing spring 30.

The seal member 100 is an O-ring made of rubber, disposed between the joint surface 92b of the stator 90 and the flange 84 of the guide sleeve 80, and sealing a joint region of the stator 90 and the guide sleeve 80.

The bracket 110 is formed of a metal material and includes an annular part 111 and an attachment part 112.

The annular part 111 is sandwiched between the mold unit 130 and the stator 90 (end yoke 92), and is also fitted and fixed in a fitting recess 152 of the outer yoke 150.

The attachment part 112 extends outside the outer yoke 150 and is fixed to the engine body EB by a screw or the like.

The inner yoke 120 forms a part of a magnetic path, is formed of a ferromagnetic material into a bottomed cylindrical shape with collar, and includes, as shown in FIG. 4 and FIG. 11, a cylindrical part 121 and a collar 122.

The cylindrical part 121 is formed so that the guide sleeve 80 is fitted inside thereof and the bobbin 131 of the mold unit 130 is fitted outside thereof.

The collar 122 is fitted into a fitting recess 153 of the outer yoke 150 and fixed by crimping.

As shown in FIG. 4 and FIG. 11, the mold unit 130 includes the bobbin 131 made of resin fitted into the cylindrical part 121 of the inner yoke 120, a coil 132 for excitation wound around the bobbin 131, and a connector 133 integrally formed with a cylindrical part covering around the coil 132 and surrounding a terminal.

The seal member 140 is an O-ring made of rubber, disposed between the collar 122 of the inner yoke 120 and the bobbin 131 of the mold unit 130 and sealing a space between the bobbin 131 and the inner yoke 120.

The outer yoke 150 forms a part of a magnetic path, is formed of a ferromagnetic material into a cylindrical shape, and includes, as shown in FIG. 4 and FIG. 11, a cylindrical part 151, the fitting recess 152 and the fitting recess 153.

The cylindrical part 151 is formed in a cylindrical shape centered on the axis S, and is formed to cover from the outside in the radial direction, a region of the mold unit 130 wound by the coil 132, the collar 122 of the inner yoke 120, the annular part 111 of the bracket 110, the stator 90 (end yoke 92), and the flange 15 of the sleeve 10.

In a state in which the annular part 111 of the bracket 110, the stator 90 (end yoke 92), and the flange 15 of the sleeve 10 are fitted into the fitting recess 152 in the axis S direction, by crimping a tip region of the fitting recess 152, the annular part 111, the stator 90 (end yoke 92) and the flange 15 are fixed.

In a state in which the collar 122 of the inner yoke 120 is fitted into the fitting recess 153, by crimping a tip region of the fitting recess 153, the collar 122 is fixed.

Next, the assembly work of the electromagnetic switching valve V is described with reference to FIG. 8 to FIG. 10.

Figure 8:
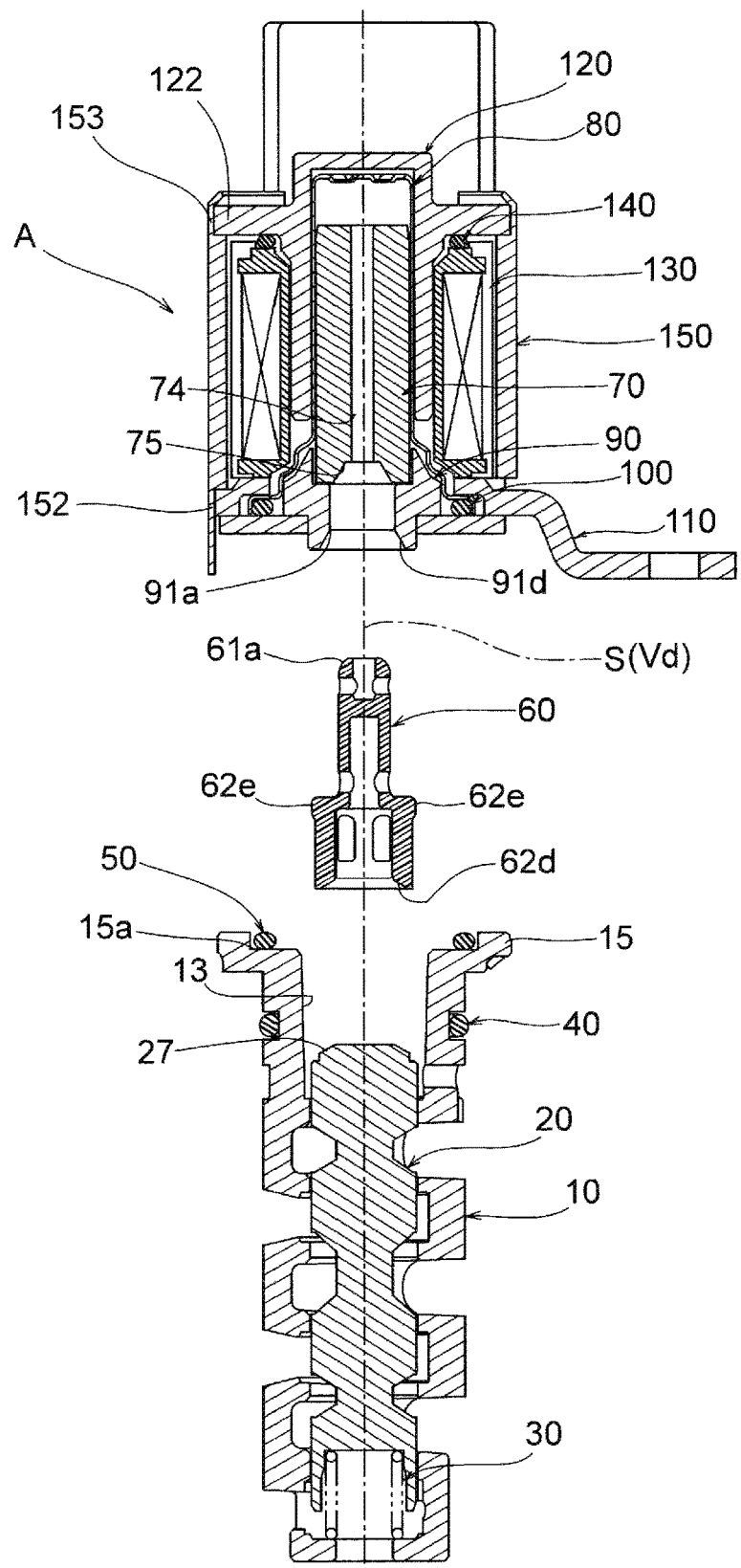
FIG. 8 is a cross-sectional view describing assembly of a transmission member in an electromagnetic switching valve according to an embodiment.

First, as shown in FIG. 8, the sleeve 10 having the seal member 40 assembled therein, the energizing spring 30, the spool 20, the seal member 50, the transmission member 60, and the electromagnetic actuator A are prepared.

Here, as shown in FIG. 8, in the prepared electromagnetic actuator A, the seal member 140, the mold unit 130, the bracket 110, the guide sleeve 80, the plunger 70, the seal member 100 and the stator 90 are assembled into the outer yoke 150 in which the collar 122 of the inner yoke 120 is fitted and crimped into the fitting recess 153, and in a state in which the fitting recess 152 is not crimped, the stator 90 and the like are held by an electromagnetic attraction force generated by energizing the coil 132 so as not to fall off.

Subsequently, the sleeve 10 is oriented in the vertical direction Vd and fixed by a predetermined jig, the energizing spring 30 and the spool 20 are assembled in the sleeve 10, and the seal member 50 is disposed in the annular recess 15a of the sleeve 10. Moreover, the sleeve 10 may be erected in the vertical direction Vd after the energizing spring 30 and the spool 20 are pre-assembled therein.

Subsequently, the transmission member 60 is disposed above the spool 20 with the annular abutting part 62d being the lower end of the transmission member 60 facing downward.

In addition, the electromagnetic actuator A that is kept energized is disposed above the transmission member 60 with the insertion hole 91a of the stator 90 facing downward.

Moreover, the electromagnetic actuator A may also be disposed after dropping work of the transmission member 60.

Subsequently, the transmission member 60 is dropped from the vertical direction Vd so that the annular abutting part 62d being the lower end of the transmission member 60 abuts against the spool 20.

Figure 9:
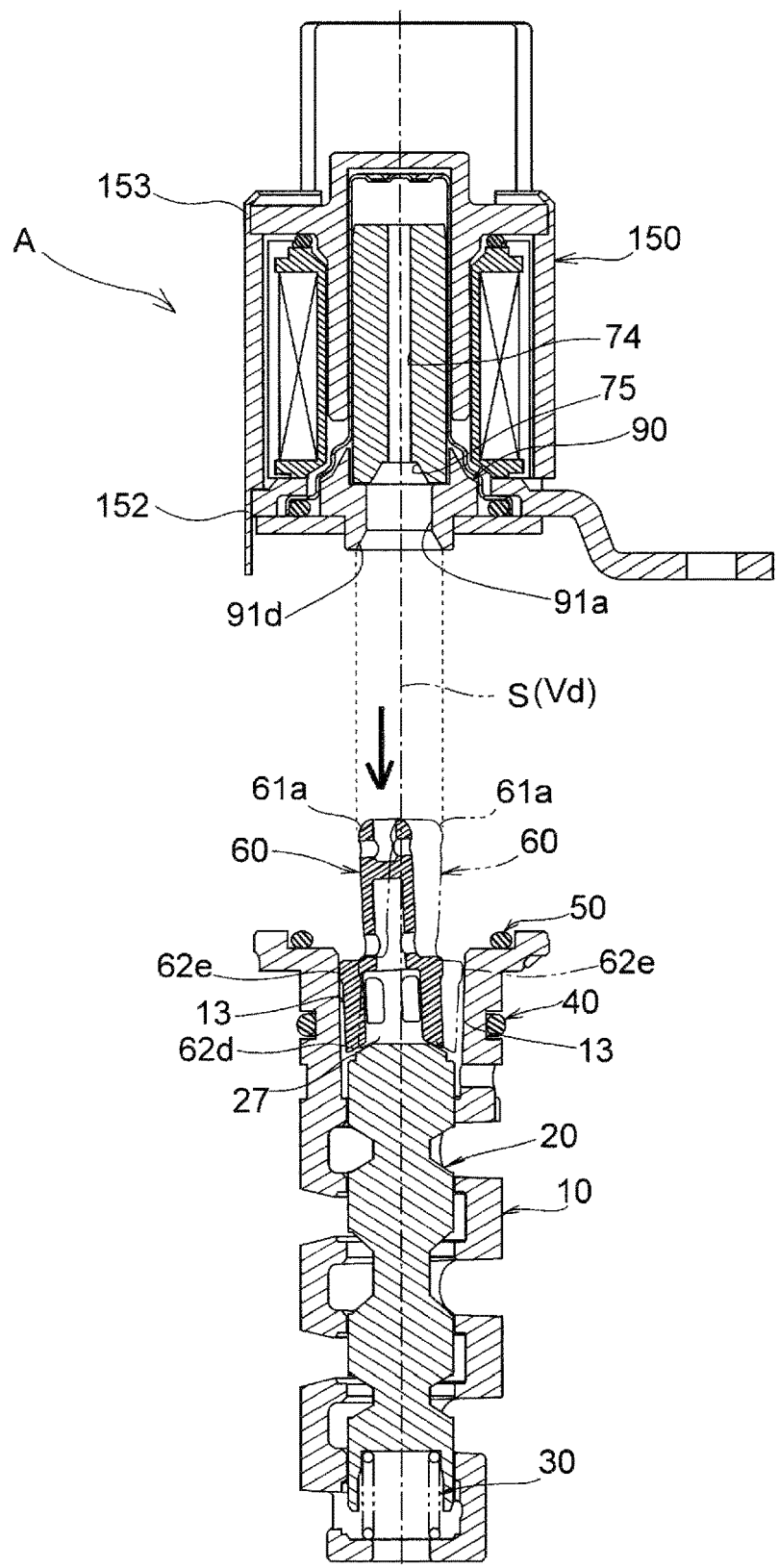
FIG. 9 is a cross-sectional view describing assembly of a transmission member in an electromagnetic switching valve according to an embodiment.

In this dropping work, the transmission member 60 generally abuts against the spool 20 in a state in which the transmission member 60 deviates from the axis S and is inclined, as shown in FIG. 9.

Here, as shown in FIG. 9, some of the plurality of protruding ribs 62e as the regulated part of the transmission member 60 contact the inner peripheral surface 13 of the sleeve 10 and regulate the inclination of the transmission member 60.

In this regulated state, the protruding rib 62e contacts the inner peripheral surface 13 of the sleeve 10, and the end 61a being the upper end of the transmission member 60 is regulated not to deviate from the range allowing it to be inserted into the insertion hole 91a of the stator 90 disposed above in the vertical direction Vd, as shown in FIG. 7.

Moreover, in this dropping work, when the annular abutting part 62d of the transmission member 60 fits the second end 27 of the spool 20, that is, when the concave tapered surface of the annular abutting part 62d is reliably fitted into the convex curved surface of the second end 27, the transmission member 60 is disposed upright on the axis S without the protruding rib 62e contacting the inner peripheral surface 13.

Figure 10:
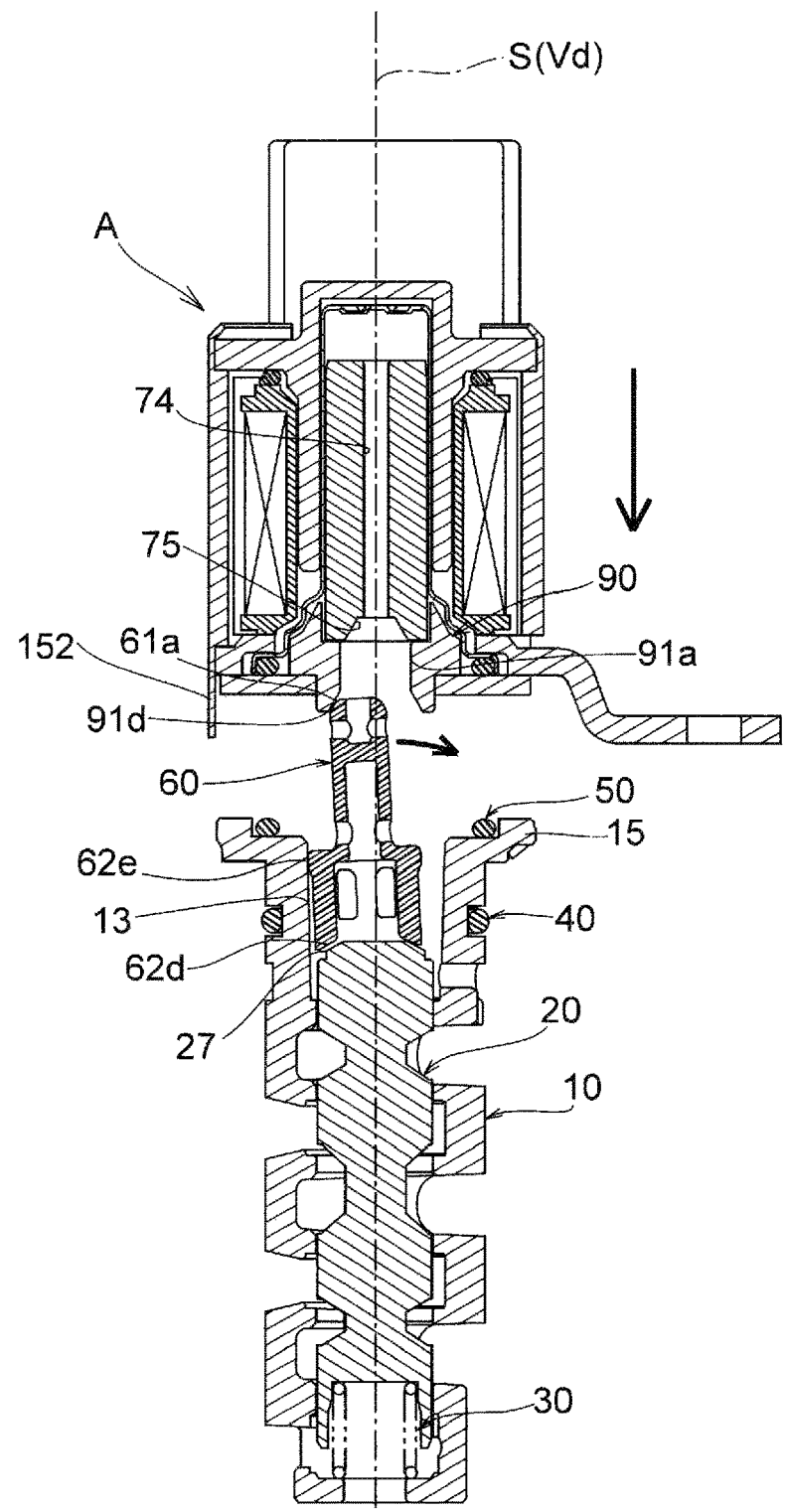
FIG. 10 is a cross-sectional view describing assembly of a transmission member in an electromagnetic switching valve according to an embodiment.

Subsequently, as shown in FIG. 10, when the electromagnetic actuator A is brought close to the transmission member 60 from the vertical direction Vd, the guide part 91d of the stator 90 contacts the end 61a being the upper end of the transmission member 60.

Then, as the electromagnetic actuator A descends, the guide part 91d guides the end 61a of the transmission member 60 onto the axis S. Then, the end 61a and the small-diameter tubular part 61 of the transmission member 60 are guided and inserted into the insertion hole 91a of the stator 90.

Further, when the electromagnetic actuator A descends, the end 61a of the transmission member 60 is guided by the insertion hole 91a of the stator 90, and as the end 61a of the transmission member 60 is inserted into the receiving recess 75 of the plunger 70, the annular abutting part 62d of the transmission member 60 fits the second end 27 of the spool 20, and the transmission member 60 is positioned on the axis S and its posture is corrected to the upright state. In addition, the flange 15 of the sleeve 10 abuts against the stator 90 (end yoke 92) and is fitted into the fitting recess 152 of the outer yoke 150.

Accordingly, the transmission member 60 is interposed between the spool 20 and the plunger 70 and positioned on the axis S.

After that, by crimping the tip region of the fitting recess 152, the assembly work of the electromagnetic switching valve V is completed.

In the above configuration, since the end 61a of the transmission member 60 is formed as a convex curved surface and the guide part 91d is formed as a concave tapered surface, in the assembly work, the end 61a of the transmission member 60 can be smoothly guided on the axis S along the guide part 91d of the stator 90 without sticking or jamming or the like.

In addition, since the annular abutting part 62d of the transmission member 60 is formed as a concave tapered surface and the second end 27 of the spool 20 is formed as a convex curved surface, by fitting the concave tapered surface with the convex curved surface face-to-face, in the assembly work, the transmission member 60 can be easily aligned with the spool 20 on the same axis (axis S), and the posture of the transmission member 60 can be easily corrected to the upright state.

In addition, since the insertion hole 91a of the stator 90 is formed having an inner diameter dimension that regulates the transmission member 60 not to deviate from the range allowing the end 61a of the transmission member 60 to be inserted into the receiving recess 75 of the plunger 70, in the assembly work, the end 61a of the transmission member 60 can be easily guided and inserted into the receiving recess 75 of the plunger 70 without sticking or jamming or the like.

In addition, since the protrusion as the regulated part protruding from the outer peripheral surface of the transmission member 60 is formed as the plurality of protruding ribs 62e protruding from the outer peripheral surface 62s of the large-diameter tubular part 62 of the transmission member 60, in the assembly work, the inclination angle of the transmission member 60 deviating from the axis S can be suppressed to be small without increasing the protrusion amount of the protruding ribs 62e.

Furthermore, since the transmission member 60 is formed of a resin material, the transmission member 60 can be easily formed to include a plurality of protruding ribs 62e and a plurality of lightening parts 62c.

Next, a switching operation of the electromagnetic switching valve V is described.

First, in a non-energized state of the coil 132, by the energizing force of the energizing spring 30 via the spool 20 and the transmission member 60, the plunger 70 stops in the rest position where the second end 73 abuts against the stopper 83, as shown in FIG. 11.

In addition, the spool 20 stops in a retreat position corresponding to the rest position of the plunger 70 via the transmission member 60.

In this retreat position, the first valve 22 of the spool 20 is in a state of closing an oil passage between the first port 11e and the supply port 11b and opening an oil passage between the first port 11e and the discharge port 11c.

In addition, the second valve 23 of the spool 20 is in a state of opening an oil passage between the second port 11f and the supply port 11b and closing an oil passage between the second port 11f and the discharge port 11d.

At this time, the hydraulic oil is discharged through the first oil passage 5 and supplied through the second oil passage 6.

Subsequently, when the coil 132 is appropriately energized and the magnetomotive force is generated, the plunger 70 advances while resisting the energizing force of the energizing spring 30. As shown in FIG. 12, the first end 26 of the spool 20 abuts against the receiving part 14, and the spool 20 is positioned in the maximum advance position.

In this maximum advance position, the first valve 22 of the spool 20 is in a state of opening the oil passage between the first port 11e and the supply port 11b and closing the oil passage between the first port 11e and the discharge port 11c.

In addition, the second valve 23 of the spool 20 is in a state of closing the oil passage between the second port 11f and the supply port 11b and opening the oil passage between the second port 11f and the discharge port 11d.

At this time, the hydraulic oil is supplied through the first oil passage 5 and discharged through the second oil passage 6.

Moreover, the energization of the coil 132 can be appropriately controlled and the spool 20 can be stopped in an intermediate position.

In this intermediate position, the first valve 22 of the spool 20 is in a state of closing the oil passage between the first port 11e and the supply port 11b and closing the oil passage between the first port 11e and the discharge port 11c.

In addition, the second valve 23 of the spool 20 is in a state of closing the oil passage between the second port 11f and the supply port 11b and closing the oil passage between the second port 11f and the discharge port 11d.

At this time, the supply and discharge of hydraulic oil are cut off in both the first oil passage 5 and the second oil passage 6.

When the electromagnetic switching valve V performing the above switching operation is applied to, for example, the valve timing changing device M of the camshaft CS on the intake side of the internal combustion engine, the first oil passage 5 is connected to the advance chamber AC and the second oil passage 6 is connected to the retard chamber RC.

Therefore, when the plunger 70 is in the rest position, a valve timing of an intake valve is held in a retard position, and by advancing the plunger 70 according to an operation condition, the valve timing of the intake valve is positioned in an advance position.

On the other hand, when the electromagnetic switching valve V performing the above switching operation is applied to, for example, the valve timing changing device M of the camshaft CS on the exhaust side of the internal combustion engine, the first oil passage 5 is connected to the retard chamber RC and the second oil passage 6 is connected to the advance chamber AC.

Therefore, when the plunger 70 is in the rest position, a valve timing of an exhaust valve is held in the advance position, and by advancing the plunger 70 according to an operation condition, the valve timing of the exhaust valve is positioned in the retard position.

Next, the flow of the hydraulic oil around the plunger 70 and the transmission member 60 in the electromagnetic switching valve V performing the above switching operation is described.

When the plunger 70 advances from the rest position, as shown in FIG. 12, the hydraulic oil in the advance movement space FS passes through the through passage 74 of the plunger 70 via the first opening 61d and the first internal passage 61c of the transmission member 60, and flows into the retreat movement space RS defined behind the plunger 70, as shown by arrows. Accordingly, the plunger 70 is able to smoothly advance.

On the other hand, in the internal space SS of the sleeve 10, the transmission member 60 is pushed by the plunger 70 and advances together with the spool 20.

Here, the passage area of the gap G defined around the small-diameter tubular part 61 of the transmission member 60 in the insertion hole 91a of the stator 90 is equal to or smaller than the passage area of the first opening 61d, that is, the passage area of the gap G is formed as small as possible in the range in which the viscous resistance does not increase. Therefore, it becomes difficult for the hydraulic oil (in particular foreign matter) in the internal space SS to flow into the advance movement space FS through the insertion hole 91a.

In this state, in the hydraulic oil in the internal space SS, because the annular stepped part 63 and the annular facing part 91e are separated by an increasing distance, for example, as shown by the arrows in FIG. 12, the hydraulic oil in the second internal passage 61e of the transmission member 60 flows from the second opening 61f into the internal space SS, and the hydraulic oil in the internal space SS outside the transmission member 60 flows from the second opening 62b into the second internal passages 62a and 61e, or the hydraulic oil in the vicinity of the discharge port 11d and the discharge oil passage 4 flows into the internal space SS through the communication passage 11i. In this way, the hydraulic oil in the internal space SS circulates around the transmission member 60 on the whole.

When the plunger 70 retreats toward the rest position from the advance position, as shown by arrows in FIG. 11, the hydraulic oil in the retreat movement space RS passes through the first passage 61c and the first opening 61d of the transmission member 60 via the through passage 74 of the plunger 70, and flows into the advance movement space FS defined on a front side of the plunger 70. Accordingly, the plunger 70 is able to smoothly retreat.

On the other hand, in the internal space SS of the sleeve 10, due to the energizing force of the energizing spring 30, the transmission member 60 retreats together with the spool 20, following the plunger 70.

Here, similarly to the above, the passage area of the gap G defined around the small-diameter tubular part 61 of the transmission member 60 in the insertion hole 91a of the stator 90 is equal to or smaller than the passage area of the first opening 61d, that is, the passage area of the gap G is formed as small as possible in the range in which the viscous resistance does not increase. Therefore, it becomes difficult for the hydraulic oil (in particular foreign matter) in the internal space SS to flow into the advance movement space FS through the insertion hole 91a.

In this state, in the hydraulic oil in the internal space SS, because the annular stepped part 63 and the annular facing part 91e are separated by a decreasing distance, for example, as shown by the arrows in FIG. 11, the hydraulic oil in the internal space SS outside the transmission member 60 flows from the second opening 61f of the transmission member 60 into the second internal passage 61e, and the hydraulic oil in the second internal passages 62a and 61e inside the transmission member 60 flows from the second opening 62b into the internal space SS outside the transmission member 60, or the hydraulic oil in the internal space SS flows out to the discharge port 11d and the discharge oil passage 4 through the communication passage 11i. In this way, the hydraulic oil in the internal space SS circulates around the transmission member 60 on the whole. Here, since the passage area of the first internal passage 61c is formed equal to or larger than the passage area of the through passage 74, and the passage area of the first opening 61d is formed equal to or larger than the passage area of the first internal passage 61c, when the hydraulic oil moves from the advance movement space FS to the retreat movement space RS or moves from the retreat movement space RS to the advance movement space FS, a dampering effect or the like caused by throttling resistance can be prevented from occurring and the plunger 70 can be smoothly operated.

In addition, since the annular stepped part 63 of the transmission member 60 faces the annular facing part 91e of the stator 90 in the axis S direction, according to a change in the distance that separates the two, the hydraulic oil can be actively circulated in a region of the internal space SS.

Therefore, when foreign matter is mixed in the hydraulic oil in the internal space SS, the foreign matter can be prevented from flowing into an operation region of the plunger 70 through the insertion hole 91a. Accordingly, the plunger 70 can be prevented from being worn or locked by jamming of the foreign matter.

If the foreign matter in the hydraulic oil jams around the spool 20, the jamming state can be eliminated by appropriately reciprocating the plunger 70.

According to the electromagnetic switching valve V having the above configuration, in assembling the electromagnetic switching valve V, while the assembly work is simplified and facilitated and while the transmission member 60 is undergoing alignment, the transmission member 60 transmitting the driving force of the plunger 70 to the spool 20 can be easily assembled. In addition, the electromagnetic switching valve V can be provided in which the foreign matter in the hydraulic oil can be prevented from flowing into a sliding region of the plunger 70 during use even after the assembly.

In this way, by adopting the transmission member 60 that is not integrally fixed to the spool 20 or the plunger 70, without a need to perform centering of each component with high accuracy, at the time of assembly, the transmission member 60 can be assembled while minor misalignment is absorbed by the transmission member 60.

Although the transmission member 60 having the small-diameter tubular part 61 and the large-diameter tubular part 62 is shown as the transmission member in the above embodiment, the disclosure is not limited thereto, and a transmission member may be adopted in which a protrusion protruding from an outer peripheral surface of a tubular member having a single outer diameter is provided as the regulated part.

Although the plurality of protruding ribs 62e radially protruding from the outer peripheral surface 62s of the large-diameter tubular part 62 are adopted as the regulated part of the transmission member in the above embodiment, the disclosure is not limited thereto, and a regulated part in other form may be adopted as long as it is regulated not to deviate the range allowing the upper end of the transmission member to be inserted into the insertion hole of the stator.

Although the transmission member 60 formed of a resin material is shown as the transmission member in the above embodiment, the disclosure is not limited thereto, and a transmission member formed of other nonmagnetic material may be adopted.

Although a case where the electromagnetic switching valve V is fitted into the fitting hole H of the engine body EB is shown in the above embodiment, the disclosure is not limited thereto, and the electromagnetic switching valve V may be mounted in other places.

In the above electromagnetic switching valve, a configuration may be adopted in which the regulated part includes a protrusion protruding from an outer peripheral surface of the transmission member to contact and be regulated by an inner peripheral surface of the sleeve.

In the above electromagnetic switching valve, a configuration may be adopted in which the protrusion includes a plurality of protruding ribs disposed discretely in a circumferential direction on the outer peripheral surface of the transmission member.

In the above electromagnetic switching valve, a configuration may be adopted in which the stator includes, around the insertion hole, a guide part guiding the upper end of the transmission member onto the axis.

In the above electromagnetic switching valve, a configuration may be adopted in which the guide part is formed in a concave tapered surface or a concave curved surface centered on the axis.

In the above electromagnetic switching valve, a configuration may be adopted in which the lower end of the transmission member is formed in a concave tapered surface, and the spool includes an end formed in a convex curved surface to abut against the lower end of the transmission member.

In the above electromagnetic switching valve, a configuration may be adopted in which the upper end of the transmission member is formed in a convex curved surface, and the plunger includes a receiving recess formed in a concave tapered surface to abut against the upper end of the transmission member.

In the above electromagnetic switching valve, a configuration may be adopted in which the insertion hole of the stator is formed having an inner diameter dimension regulating the transmission member not to deviate from the range allowing the upper end of the transmission member to be inserted into the receiving recess of the plunger.

In the above electromagnetic switching valve, a configuration may be adopted in which the transmission member includes a large-diameter tubular part disposed in the sleeve, and a small-diameter tubular part inserted through the insertion hole of the stator, the large-diameter tubular part including the regulated part.

In the above electromagnetic switching valve, a configuration may be adopted in which the regulated part includes a protrusion protruding from an outer peripheral surface of the large-diameter tubular part to contact and be regulated by the inner peripheral surface of the sleeve.

In the above electromagnetic switching valve, a configuration may be adopted in which the protrusion includes a plurality of protruding ribs disposed discretely in the circumferential direction on the outer peripheral surface of the large-diameter tubular part.

In the above electromagnetic switching valve, a configuration may be adopted in which the transmission member includes a lightening part formed between the adjacent protruding ribs so as to be recessed radially inward from the outer peripheral surface of the large-diameter tubular part.

In the above electromagnetic switching valve, a configuration may be adopted in which the transmission member is formed of a resin material.

According to the electromagnetic switching valve having the above configuration, in assembling the electromagnetic switching valve, the transmission member transmitting the driving force of the plunger to the spool can be easily assembled while the assembly work is simplified and facilitated.

INDUSTRIAL APPLICABILITY

As described above, according to the electromagnetic switching valve of the disclosure, in assembling the electromagnetic switching valve, the transmission member transmitting the driving force of the plunger to the spool can be easily assembled while the assembly work is simplified and facilitated. Therefore, it is needless to say that the disclosure can be applied to an engine mounted on a vehicle such as an automobile or a two-wheeler or the like desired to be mass-produced, and the disclosure is also useful in controlling the flow of hydraulic oil in other hydraulic equipment.

What is claimed is:

1. An electromagnetic switching valve comprising:
a sleeve, defining a port communicating with an oil passage supplying or discharging hydraulic oil;
a spool, reciprocally movably disposed on a predetermined axis in the sleeve, opening and closing the port;
an electromagnetic actuator, comprising a plunger disposed on the axis and a stator exerting a magnetomotive force on the plunger; and
a transmission member of a tubular shape, disposed on the axis to be interposed between the plunger and the spool and transmit a driving force, wherein
the stator comprises an insertion hole through which the transmission member is inserted,
the transmission member comprises a regulated part that is regulated not to deviate from a range allowing an upper end of the transmission member to be inserted into the insertion hole of the stator when the transmission member is dropped and assembled into the sleeve from a vertical direction to cause a lower end of the transmission member to abut against the spool integrated into the sleeve,
the stator comprises a guide part that serves to guide the upper end of the transmission member onto the axis when the transmission member is inserted into the insertion hole of the stator, and
the transmission member is not integrally fixed to the spool and the plunger,
wherein the regulated part comprises a protrusion protruding from an outer peripheral surface of the transmission member to contact and be regulated by an inner peripheral surface of the sleeve, and the protrusion comprises a plurality of protruding ribs disposed discretely in a circumferential direction on the outer peripheral surface of the transmission member.

2. The electromagnetic switching valve according to claim 1, wherein
the guide part is formed to be around the insertion hole.

3. The electromagnetic switching valve according to claim 2, wherein
the guide part is formed in a concave tapered surface or a concave curved surface.

4. The electromagnetic switching valve according to claim 1, wherein
the lower end of the transmission member is formed in a concave tapered surface, and
the spool comprises an end formed in a convex curved surface to abut against the lower end of the transmission member.

5. The electromagnetic switching valve according to claim 1, wherein
the upper end of the transmission member is formed in a convex curved surface, and
the plunger comprises a receiving recess formed in a concave tapered surface to abut against the upper end of the transmission member.

6. The electromagnetic switching valve according to claim 5, wherein
the insertion hole of the stator is formed having an inner diameter dimension regulating the transmission member not to deviate from the range allowing the upper end of the transmission member to be inserted into the receiving recess of the plunger.

7. The electromagnetic switching valve according to claim 1, wherein
the transmission member comprises a large-diameter tubular part disposed in the sleeve, and a small-diameter tubular part inserted through the insertion hole of the stator, wherein
the large-diameter tubular part comprises the regulated part.

8. The electromagnetic switching valve according to claim 7, wherein the protrusion protrudes from an outer peripheral surface of the large-diameter tubular part to contact and be regulated by an inner peripheral surface of the sleeve.

9. The electromagnetic switching valve according to claim 8, wherein the plurality of protruding ribs are disposed discretely in a circumferential direction on the outer peripheral surface of the large-diameter tubular part.

10. The electromagnetic switching valve according to claim 9, wherein the transmission member comprises a lightening part formed between the adjacent protruding ribs so as to be recessed radially inward from the outer peripheral surface of the large-diameter tubular part.

11. The electromagnetic switching valve according to claim 1, wherein the transmission member is formed of a resin material.

* * * * *